3,399,064
METHOD OF MANUFACTURE OF KETCHUP
Anthony S. Partyka, Chicago, and George Bosy, Park Ridge, Ill., assignors to National Dairy Products Corporation, New York, N.Y., a corporation of Delaware
Filed May 18, 1966, Ser. No. 551,095
3 Claims. (Cl. 99—144)

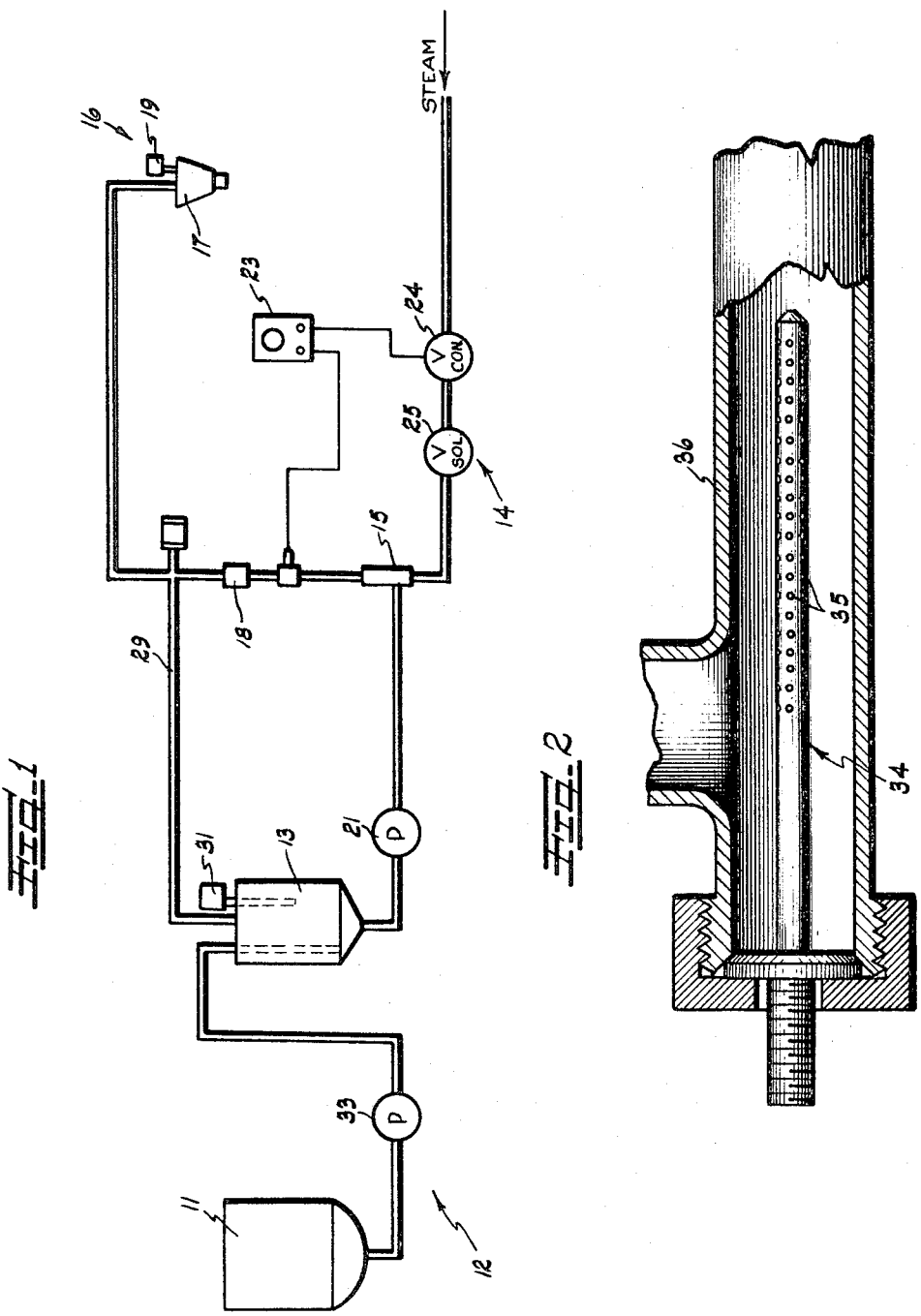
INVENTORS
ANTHONY S. PARTYKA
GEORGE BOSY
BY Anderson, Luedeka, Fitch, Even, & Tabin ATTORNEYS United States Patent Office 3,399,064
Patented Aug. 27, 1968

ABSTRACT OF THE DISCLOSURE

Ketchup prepared by forming a mixture of ketchup ingredients without heating and heating the mixture by contacting the mixture with increments of steam.

---

The present invention generally relates to a tomato product and more particularly it relates to the preparation of improved tomato ketchup.

Ketchup is a condiment prepared from one or more of the following tomato ingredients: (1) a liquid tomato dispersion obtained from ripe tomatoes of red or reddish variety, (2) a liquid tomato dispersion obtained as a by-product from preparing tomatoes for canning, consisting of peelings and cores, (3) a liquid tomato dispersion obtained as a by-product from partial extraction of juice from tomatoes. Such precursive ketchup liquid tomato dispersions are obtained by straining the tomatoes or by products, with or without heating, so as to remove skin, seeds, and other coarse or hard substances. When such liquid tomato dispersion is obtained without heating, the process is generally referred to as a "cold-break" process; when a heating step is utilized the process is known as a "hot-break" process. After straining, the liquid dispersion is concentrated and is then seasoned with sugar, salt, vinegar and spices. The mixture of concentrated liquid tomato dispersion and the other ingredients is then cooked so as to develop flavor. The cooked mixture is then sealed in a container. The mixture is heat-treated, either before or after sealing, so as to prevent spoilage.

According to one known process for the manufacture of tomato ketchup, tomato paste, sugar, and water are added to a jacketed kettle in preselected proportions to form a ketchup mix. Relatively non-volatile spices, such as salt, onion powder, red pepper, and garlic powder, are then added to the ketchup mix and the mixture is heated and boiled for about 2 minutes. Vinegar is then added and boiling is continued for an additional two minutes. The more volatile spices, such as cinnamon, celery seeds, cloves and mace, are then added and heating is continued to provide an additional two minutes of boiling. The resultant cooked ketchup is cooled to 150° F. by running cold water through the kettle jacket and is then pumped into a holding tank. The ketchup from the holding tank is reheated to a temperature of from about 174° to 178° F. in a heat exchanger before the ketchup is filled into suitable containers. The ketchup is continually cycled through the heat exchanger, a by-pass loop being provided to recycle ketchup to the holding tank when an excess over the requirements of the filling station is being pumped.

Such known method of ketchup manufacture has numerous disadvantages. The ketchup mixture tends to bake on the inside kettle wall and to thus retard heat transfer. The boil and re-boil procedure for cooking the ketchup ingredients results in flavor loss through evaporation. Also boiling, cooling and then reheating the ketchup product through a heat exchanger, coupled with excessive re-circulation of the ketchup product tends to cause separation of the ketchup during storage in the container (and possibly requires more tomato paste ingredients than if the process were less heat abusive).

Accordingly, it is the principal object of the present invention to provide an improved method of manufacturing tomato ketchup. It is a particular object of the present invention to provide a method for manufacturing tomato ketchup which minimizes heat degradation of tomato solids utilized in preparing the tomato ketchup.

Further objects and advantages of the present invention will be apparent from a study of the following detailed description and drawings wherein, FIGURE 1 is a schematic flow sheet illustrating various features of the process of said invention; and FIGURE 2 is a fragmentary view, partly broken away, of a nozzle used in the process of this invention.

In general, the process of the present invention includes the steps of forming a mixture of ketchup ingredients without heating and then subsequently heating the mixture to effect cooking and pasteurization by direct contact of the mixture with sanitary steam.

A system which may be used for production of tomato ketchup according to the practice of this invention is illustrated in the flow sheet of FIGURE 1. The system comprises a mix preparation section 12, a heat treatment section 14, a filling section 16, and various pumps, valves and controls as will be described more fully hereinafter.

The mix preparation section 12 comprises a mix tank 11, and a surge tank 13 in fluid communication with mix tank 11 through pump 33. The heat treatment section 14, which is in fluid communication with the surge tank 13 through pump 21, comprises a steam injection nozzle 15, a back pressure orifice 18, a three way valve 27, a bypass return line 29, an automatic controller 23 and control valves 24 and 25. The filling section 16 comprises a fill hopper 17 and a liquid level controller 19.

The surge tank 13 is used to permit the system to be operated continuously. In this connection, the surge tank 13 is supplied with a liquid level controller 31 which in turn operates pump 33 to supply ketchup ingredients from mixing tank 11 as required.

In operation, the total flow of the system to the fill hopper 17, as shown in FIGURE 1, is controlled by the level control 19 on the fill hopper 17. The pump 21 is adjusted to keep a minimum level in the fill hopper 17 when operated continuously. Under these conditions the system runs continuously with no interruptions in the steam supply which is controlled by an automatic controller 23, which operates the pneumatic pressure control valve 24. Back pressure orifice 18 provides a suitable pressure drop for facilitating operation of the pneumatic pressure control valve 24. If at anytime the fill hopper 17 fills to where the level control 19 is actuated, a solenoid control valve 25 closes and shuts off the steam supply thereby causing the ketchup product temperature to fall below the low limit setting of the automatic controller 23.

In this condition, as illustrated in FIGURE 1, in accordance with known practice, a bypass return line 29 is provided to divert ketchup which has not been heated to the desired temperature to the surge tank 13. The automatic controller 23 actuates the three-way valve 27 to divert the ketchup product back to the surge tank via the bypass return line 29. When the level of ketchup product in the fill hopper 17 drops below the high level control setting, the solenoid valve 25 opens the steam supply to heat the product until the low temperature limit of the automatic controller 23 is reached. The three-way valve 27 is then actuated by the automatic controller 23 to send the ketchup product to the fill hopper 17. The pump 21 runs continuously. The solenoid actuated valve 25 is interlocked with the pump so that if the pump is off, the valve is closed.

As described above, a ketchup formulation normally includes a concentrated dispersion of tomato solids, water, sugar, vinegar, salt, and spices or flavoring materials. Tomato solids are generally present at a level of from about 16 percent to about 18 percent by weight of the finished ketchup. The total solids content of the finished ketchup will be from about 25 to about 37 percent.

In the practice of this invention, a concentrated tomato dispersion produced by either a "cold-break" or a "hot-break" process may be used. However, it is preferred to use a "hot-break" tomato dispersion, since this provides a higher level of pectin and results in a ketchup with a more desirable texture and consistency. Of course, fresh tomatoes may also be used to provide the tomato solids of the ketchup formulation if means are provided to pulversize, strain, and concentrate the fresh tomatoes to provide the concentrated tomato dispersion.

The various ingredients comprising the ketchup formulation may be mixed by any suitable method. One such method is to add the ingredients to a mixing tank provided with stirring means and then to mix or stir the ingredients until a suitable intimate dispersion is obtained. In this connection, all of the ingredients are added to the mixing tank during the mixing step and the ingredients are not heated during this step. The order of addition of ingredients to the mixing tank is not important, however, the time required for mixing may be somewhat shortened if the spices, sugar, salt, and vinegar are first dissolved in the water, followed by addition and blending of the tomato paste. Similarly, although not required for the practice of this invention, some additional reduction in mixing time may be effected by heating the water prior to introduction into the kettle.

Heating to effect cooking and pasteurization of the ketchup formulation is then effected by contacting a stream of blended ketchup ingredients with sanitary steam while the ingredients are being pumped from the mixing kettle to packaging equipment. Thus, when ketchup is prepared according to the high temperature short time steam treatment method of this invention, there is no necessity for extensive cooking treatment of the ketchup ingredients prior to packaging. This avoids the previously mentioned prior art disadvantages of flavor loss through evaporation, excessive heat abuse and baking of the ketchup mixture on the walls of cooking kettles.

The steam may be injected into the stream of ketchup ingredients by any suitable method, such as a jet mixer or the like. However, a preferred method of contacting the steam with the stream of ketchup ingredients is to introduce the steam gradually into the flowing stream to avoid turbulence and steam impingement on the flowing particles of ketchup ingredients, which might result in product degradation. One means for gradual introduction of steam is through the use of a steam injection nozzle, as shown in FIGURE 2. The nozzle 34 contains a plurality of holes 35 spaced at intervals in a line along the length of the nozzle and spaced in angular relation around the circumference of the nozzle. The nozzle 34 is located within a pipe 36 through which the ketchup ingredients flow as they are transferred to a filling hopper 17. This nozzle distributes the total quantity of steam gradually along the line of flow of the ketchup ingredients and evenly in a direction transverse to the flow.

The thermodynamics properties of the steam in terms of superheat, quality and saturation are not critical. However, it is desirable that the steam be completely condensed in heating the ketchup ingredients to the desired temperature to provide a known quantity of condensate that may be accounted for in mixing the ketchup formulation. That is, an amount of water corresponding to the amount of steam condensate will be held out of the ketchup formulation at the time of mixing.

After contact with the steam, the ketchup is transferred by as short a route as possible into a suitable container to prevent cooling. It is desirable to maintain the ketchup at the time of filling at a temperature of at least 172° F. In this connection, as previously described, a temperature sensing controller may be installed between the point of steam contact and the packaging station which acts to divert the ketchup back to the mixing tank when the temperature falls below the minimum desired level.

The following examples further illustrate various features of the present invention but are intended to in no way restrict the scope of the invention which is defined in the appended claims.

EXAMPLE I

A batch of ketchup was prepared using the system of FIGURE 1, according to the following formula:

| Ingredient: | Weight, lbs. |
|---|---|
| Tomato paste | 252.5 |
| Water | 77.0 |
| Sugar | 79.6 |
| Vinegar | 30.8 |
| Salt | 14.8 |
| Spices | 1.6 |

The batch was processed to provide ketchup according to the following procedure. Water was first heated to 190° F. and added to the mixing tank 11. The spices, sugar, salt, and vinegar were then added to the tank and dissolved in the hot water. Tomato paste was added and the batch was blended for one minute to provide an intimate dispersion. The dispersion of ketchup ingredients in the mixing tank was then pumped as required to the surge tank 13 by means of the pump 33.

The system as described above was then used to contact the ketchup ingredients with steam and heat the ingredients to a temperature of 174° F.–176° F. by means of the steam injection nozzle 34. The ketchup was maintained at this temperature for a period of 2 minutes prior to packaging. The condensed steam added 34 pounds of water to the formula.

The ketchup was then packaged. The temperature of the ketchup prior to packaging was 172° F.–174° F. The internal temperature of the ketchup after packaging was 155° F.–160° F.

The ketchup produced according to the above procedure provided a product with exceptional taste and texture. The product could be stored for long periods of time with no separation or browning. In this connection, the process of the present invention provides ketchup that can be stored without oxidation defects even though no de-aeration step is provided.

EXAMPLE II

Ketchup was made according to the procedure of Example I except that the steam rate and the automatic temperature controller were adjusted to provide filling temperatures of the ketchup product prior to packaging of 135° F., 155° F., and 180° F. Samples processed at each of these temperautres were then stored for 25 days at temperatures of 45° F., 72° F., 86° F., and 98° F., to determine the effect of the lower processing temperatures used in this practice of this invention on bacterial growth. The results are given below in Table I.

TABLE I

| Fill temperature, °F. | Total count, storage temp., °F. | | | | Coliform, storage temp., °F. | | | | Yeast, storage temp., °F. | | | | Mold, storage temp., °F. | | | | Staphylococci, storage temp., °F. | | | |
|---|---|---|---|---|---|---|---|---|---|---|---|---|---|---|---|---|---|---|---|---|
| | 45 | 72 | 86 | 98 | 45 | 72 | 86 | 98 | 45 | 72 | 86 | 98 | 45 | 72 | 86 | 98 | 45 | 72 | 86 | 98 |
| 135 | <10 | <10 | 20 | 20 | <10 | <10 | <10 | <10 | <10 | <10 | <10 | <10 | <10 | <10 | <10 | <10 | <10 | <10 | <10 | <10 |
| 155 | <10 | <10 | 30 | 20 | <10 | <10 | <10 | <10 | <10 | <10 | <10 | <10 | <10 | <10 | <10 | <10 | <10 | <10 | <10 | <10 |
| 180 | <10 | <10 | <10 | <10 | <10 | <10 | <10 | <10 | <10 | <10 | <10 | <10 | <10 | <10 | <10 | <10 | <10 | <10 | <10 | <10 |

It can be seen that various temperatures may be used to produce ketchup in accordance with this invention without yielding a product susceptible to bacterial spoilage. The optimum temperature to produce a ketchup product with desirable taste and texture is readily determined by one skilled in the art.

Various of the features of the present invention are set forth in the following claims.

What is claimed is:

1. A process for the manufacture of ketchup while minimizing heat degradation of tomato solids, which process comprises in combination, the steps of blending a mixture of ketchup ingredients without heating to a temperature sufficient to effect cooking, said mixture having less than the level of moisture desired in the final product, maintaining said mixture under agitating conditions, providing a flowing stream of said mixture, and heating said flowing stream of said mixture to a pre-determined temperature above at least about 135° F. for a period of time sufficient to cook and pasteurize the ketchup formulation, said heating occurring in a step-wise manner by contacting said flowing stream of mixture with increments of steam, the amount of said steam being sufficient, when condensed, to supply the desired level of moisture in the finished ketchup product.

2. A process according to claim 1 wherein the mixture of ketchup ingredients is heated to a temperature of from about 135° F. to about 185° F.

3. A process in accordance with claim 1 wherein said flowing stream of ketchup ingredients after being heated by contacting with said steam is transferred continuously to packaging equipment and is packaged in containers.

References Cited

UNITED STATES PATENTS

| | | | |
|---|---|---|---|
| 2,077,227 | 4/1937 | Bethune | 99—216 |
| 2,086,338 | 7/1937 | Sodergreen | 99—216 |
| 2,870,028 | 1/1959 | Anderson et al. | 99—216 |
| 3,018,182 | 1/1962 | Leach | 99—144 |

FOREIGN PATENTS 790,969 2/1958 Great Britain.

OTHER REFERENCES

Heid et al., "Food Processing Operations—Their Management, Machines, Materials, and Methods," vol. II, 1963, The Avi Publishing Co., Inc., Westport, Conn., pp. 469 to 470.

Adam et al., "Food Industries Manual" 1958, Chemical Publishing Co., Inc., New York, pp. 346 to 347.

RAYMOND N. JONES, *Primary Examiner.*

J. M. HUNTER, *Assistant Examiner.*

UNITED STATES PATENT OFFICE
CERTIFICATE OF CORRECTION

Patent No. 3,399,064                      August 27, 1968

Anthony S. Partyka et al.

It is certified that error appears in the above identified patent and that said Letters Patent are hereby corrected as shown below:

Column 2, line 18, "said" should read -- this --; line 62, "condition" should read -- connection --. Column 3, line 29, "pulversize" should read -- pulverize --. Column 4, line 30, "Ingredient:" should read -- Ingredient --; same line 30, "Weight, lbs." should read -- Weight-lbs. --.

Signed and sealed this 21st day of April 1970.

(SEAL)
Attest:

Edward M. Fletcher, Jr.               WILLIAM E. SCHUYLER, JR.

Attesting Officer                     Commissioner of Patents